United States Patent

Peacher

[15] 3,706,498

[45] Dec. 19, 1972

[54] AUTOMATIC BEAM SCANNING APPARATUS FOR EVALUATING OPTICAL BEACONS

[72] Inventor: Teddy J. Peacher, Huntsville, Ala.

[73] Assignee: The United States of America as represented by the Secretary of the Army

[22] Filed: April 23, 1971

[21] Appl. No.: 136,696

[52] U.S. Cl. .................................. 356/121, 356/218
[51] Int. Cl. .............................. G01j 1/00, G01j 1/42
[58] Field of Search ................. 356/72, 121, 218, 222

[56] References Cited

UNITED STATES PATENTS

| | | | |
|---|---|---|---|
| 2,651,963 | 9/1953 | Bischoff | 356/121 |
| 2,880,557 | 4/1959 | Todd et al. | 356/121 |
| 3,532,432 | 10/1970 | Mansour | 356/121 |
| 2,381,586 | 8/1945 | Green | 356/121 |

*Primary Examiner*—Ronald L. Wibert
*Assistant Examiner*—V. P. McGraw
*Attorney*—Harry M. Saragovitz, Edward J. Kelly, Herbert Berl and Jack W. Voigt

[57] ABSTRACT

An automatic beam scanning apparatus is disclosed wherein a cylindrical open-ended chamber houses an optical beacon for evaluation. The chamber is rotatable about its longitudinal axis for determining the beacon beam intensity at selectable points off the axis of rotation. The chamber also is traversable in a path which sweeps a beacon beam over a detector. Hence, a predetermined rotate and sweep arrangement allows detection of the spatial energy distribution of the beam of an optical beacon.

4 Claims, 2 Drawing Figures

PATENTED DEC 19 1972　　　　　　　　　　　3,706,498

Teddy J. Peacher,
INVENTOR.

AUTOMATIC BEAM SCANNING APPARATUS FOR EVALUATING OPTICAL BEACONS

SUMMARY OF THE INVENTION

The present invention provides apparatus for automatically scanning the beam of an optical beacon, which facilitates evaluation of optical beacons by allowing rapid and facile determination of the spatial energy distribution in the beam. A limit switch and relay arrangement allows the beacon output to be recorded, with the beacon position being variable with respect to a fixed reference point. An optical detector is positioned in the plane of the beacon to be tested. A traverse table allows the beacon beam to be swept across the detector or positioned at an angle with the detector. At any point in the sweep path the beacon can be rotated around the longitudinal axis allowing optical detection within the beam at a fixed radius from the optical axis of the beacon. Hence, rotation of a beacon directing a beam adjacent to a detector and traverse of the beacon across the detector allows a recording of the spatial energy distribution in the beam.

An object of this invention is to provide apparatus for rapid and facile measurement of the spatial energy distribution in a optical beacon beam.

Another object of this invention is to facilitate evaluation or optical beacons by providing a selectable rotate and sweep pattern for detecting variations of energy in a beacon beam.

DESCRIPTION OF THE PREFERRED EMBODIMENT

Figure 1:
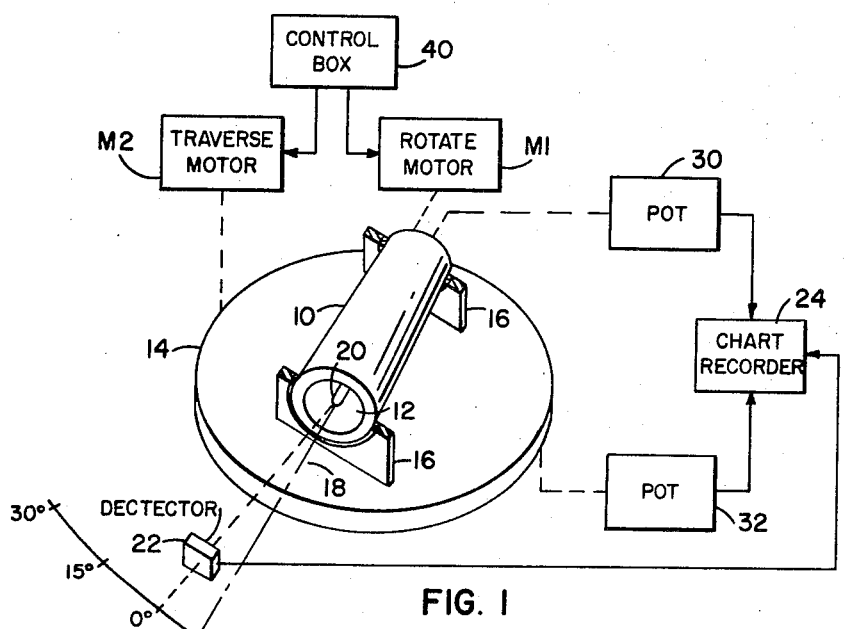
FIG. 1 is a diagrammatic view illustrating the principles of the invention, with extraneous structural members omitted.

As shown in FIG. 1, a housing 10 having an open-ended cylindrical chamber 12 therethrough is mounted on a traverse table 14. Support structure 16 at each end of housing 10 maintains the longitudinal axis 18 of the housing substantially parallel with the plane of traverse table 14. Housing 10 is adapted for rotation around axis 18 by conventional support means (not shown) between support structure 16 and the housing surface 10. An optical beacon 20 is mounted within chamber 12 with the optical axis thereof substantially along longitudinal axis 18. An optical detector 22, removed from the area of traverse table 14, is positioned in the plane of axis 18 parallel with the plane of the traverse table for receiving and responding to optical energy from beacon 20. Output electrical energy from detector 22 is coupled to a chart recorder 24 or other graphical recording means for recording the spatial pattern of optical energy sensed by detector 22. A rotate motor M1 is mechanically coupled to housing 10 for rotating housing 10 and beacon 20 around the longitudinal or optical axis 18. A traverse motor M2 is mechanically coupled to traverse table 14 to provide clockwise and counter-clockwise rotation thereof, enabling an output beam of beacon 20 to be swept across detector 22 in the plane of axis 18. Position potentiometers 30 and 32 provide a series of position peaks or timing marks for respective rotate and traverse measurements. Typically, a potentiometer may be geared so that 30° of beacon rotation provides 360° of potentiometer rotation. Hence, during every 30° of beacon rotation a mark or peak is provided by the linear output of the potentiometer and the potentiometer starts over again. Simultaneous recording of the output signals from detector 22 and potentiometers 30 and 32 allows a cross section of the energy output from the beacon beam to be identified. A control box 40 has outputs connected to rotate motor M1 and traverse motor M2 for driving housing 10 and traverse table 14. Control box 40 allows manual or automatic control of the beam scanning procedure.

Figure 2:
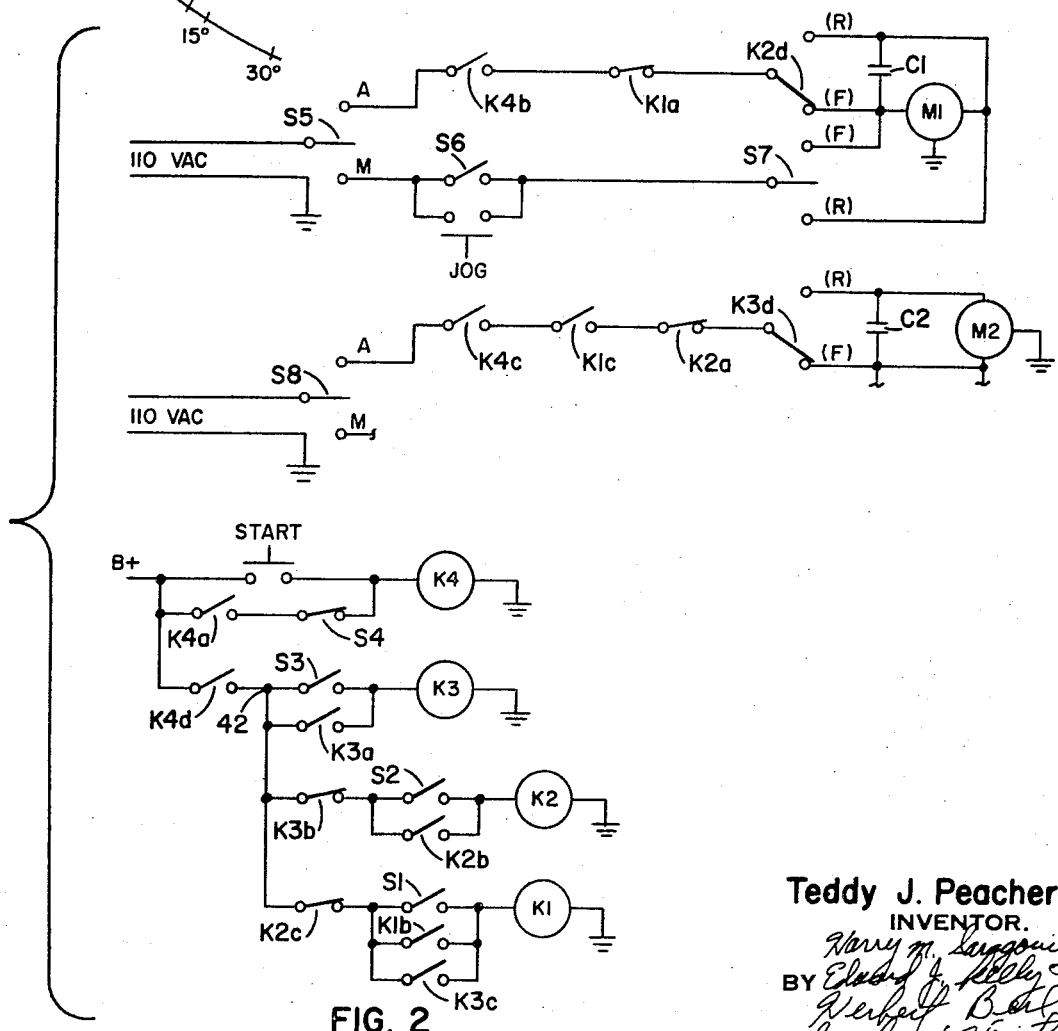
FIG. 2 is an electrical schematic of the rotate and traverse switching arrangement for the structure of FIG. 1.

The electrical circuitry for controlling the beam scanning operation is shown in FIG. 2. Limit switches S1, S2, S3 and S4, not shown in FIG. 1, are spring-return switches mounted in the rotate and traverse drive train path and are actuated when the rotation has progressed through a desired angle of rotation. The rotate motor M1 is coupled through a switch and relay arrangement to the alternator current driving voltage. In a similar manner the traverse motor M2 is coupled through a current driving voltage. For manual operation of the rotate motor M1, selector switch S5 is placed in the manual position allowing the driving voltage to be coupled to one side of a RUN switch S6 and to one side of a JOG switch, these switches being connected in parallel. The other side of S6 and the JOG switch is coupled to the blade of a single-pole, double-throw switch S7, for supplying forward or reverse voltages across the motor M1 and thereby allowing clockwise or counter-clockwise rotation of housing 10, depending on the position of switch S7. Manual operation of the traverse motor is identical to that for the rotate motor and is not shown. Within control box 40, relays K1, K2, K3 and K4 are connected to allow automatic operation of the motors. Relay contacts have the same label as respective relays with a lower case letter thereafter designating individual relay contacts. Relay K4 is connected to a direct current power source B+ through a START switch. The START switch is shunted by a make contact K4a in series with closed limit switch S4. B+ is further connected through make contact K4d to common point 42 for providing power to the remaining relays K1, K2 and K3. Relay K3 is connected through the parallel combination of open limit switch S3 and a make contact K3a to a common point 42. Relay K2 is connected through a parallel combination of open limit switch S2 and a make contact K2b to one side of break contact K3b, the other side of contact K3b being connected to common point 42. Relay K1 is connected through the parallel combination of open limit switch S1, make contact K1b, and make contact K3c to one side of a break contact K2c, the other side of K2c being connected to common point 42. Operation of these relays in response to the momentary engagement of the START switch allows automatic beam scanning to occur when selector switches S5 and S8 are placed in the automatic position. Placing selector switch S5 in the automatic position allows ac power to be coupled through a make contact K4b, a break contact K1a, and a break-make contact K2d to activate motor M1. Break-make contact K2d allows the same forward-reverse response of motor M1 that is obtained by using switch S7 in manual operation. Similarly, with selector switch S8 in the automatic position ac voltage is connected through make contact K4c, make contact K1c, break contact K2a, and break-make contact K3d to activate motor M2 in the forward or reverse position. Capacitors C1 and C2 are respectively connected across rotate motor M1 and traverse motor M2 for providing a rotating magnetic field. By switching a capacitor from one winding to another the field is reversed, reversing the rotation of the motor.

In operation, a beacon under test is mounted in chamber 12 of rotatable housing 10 with its optical axis coincident with the rotational axis 18. Limit switches S1, S2, S3 and S4 control the degree of rotation and traversal of the beam along its optical path. The traverse table scan limits can be set anywhere within 360°. The rotate scan can be set anywhere within 720°. By allowing the beacon to be rotated beyond 360° during rotational scan, various traverse scan lines of the beam across the detector are obtainable while still providing a full circle rotary scan. Manual operation of both modes is provided to recycle the unit or for accomplishing short tests without utilizing the automatic operation mode, the JOG switch allowing incremental adjustment of beacon position by momentary depression thereof. For purposes of explaining the operation of automatic beam scanning, limit switch S1 is selected to operate at 360° to stop M1 rotation and start M2 traversal, S2 is positioned to stop traversal at 20° and start rotation. S3 is positioned to stop rotation at 450° and start traversal, S4 is positioned to stop traversal and end the test at 35°. With these limits fixed, selector switches S5 and S8 are placed in the automatic position and the START switch momentarily activated. Relay K4 is activated when the START switch is momentarily closed and power is maintained thereto through holding contact K4a. B+ is supplied through closed contact K4d to point 42 for future distribution to relays K1, K2 and K3. Power is supplied through selector switch S5 and make contact K4b to rotate motor M1 in the forward or clockwise direction. M1 rotates housing 10 and beacon 20 through 360° around the axis 18. With the beacon optical axis initially directed approximately 15° away from detector 22 during this 360° of rotation, the beam intensity is measured at a given radius from the optical axis thereof throughout the 360° of rotation. Limit switch S1 is activated by the rotating housing 10 after 360° of rotation, allowing K1 to be activated. Contact K1a breaks to terminate rotation of motor M1, and K1c makes to activate forward or clockwise rotation by motor M2. Rotation of motor M2 causes the beam of beacon 20 to sweep across the face of detector 22. When the beacon is 20° out of alignment with detector 22, limit switch S2 is activated. Activation of limit switch S2 allows K2 to become energized breaking the supply power to relay K1, opening the power supply to traverse motor M2, and switching contacts K2d from the forward to reverse position for rotating beacon 20 in the counter-clockwise direction. At this point relays K4 and K2 are energized and relays K1 and K3 are de-energized. With the beacon now directed 20° out of alignment with detector 22 on the opposite side of the detector, beacon 20 rotates around axis 18 through 450°. This allows detector 22 to obtain an additional sample of energy intensity at another radius from axis 18 and sets up a traverse scan along a new scan line across the face of the beam. At 450° of rotation, limit switch S3 is momentarily activated, and relay K3 receives activating power, being held operative through holding contact K3a. Contact K3b opens deenergizing K2, contact K2c returns to the normally closed position allowing K1 to re-energize through K3c. Contact K1a breaks to stop M1 rotation. Contact K1c makes, K2a returns to the normally closed position and K3d goes to the normally open position to reverse the power to motor M2, thereby reversing the direction of traversal of table 14. Table 14 then rotates in a counter-clockwise direction, again sweeping the beacon beam across detector 22 until the beam is approximately 35° from the detector. Limit switch S4 is then activated by the traversing table, opening the switch and removing power from relay K4. Deactivation of relay K4 removes holding power through contact K4a, and B+ is removed from common point 42. Voltage is removed from the traverse motor by the opening of contact K4c, terminating testing of the beacon optical output.

Obviously many possible variations of scan pattern are obtainable by adjusting the traverse table scan limits and the rotate scan limits. By allowing the rotational motion to continue beyond 360° before contacting limit switch 3, the return traverse scan of the beam axis across the detector is along a different line in the cross-sectional plane of the beam than was the first traverse scan. For a uniformly illuminating beacon each recorded scan pattern should be substantially identical; however, for the non-uniform beacon the degree of non-uniformity is readily discovered and plotted. Thus for the instant example the beam is originally positioned at an angle 15° off center with the detector. It is then rotated for 360° around the beam axis. This allows the beam intensity at a given distance off axis to be recorded. The beam is then traversed across the detector to a point 20° off center on the other side of the detector. This traversal allows measurement of the change in intensity diagonally across the beam along a given scan line. At 20° off axis the detector has been moved relative to the axis by 5°. The beam is again rotated, this time through 450° to obtain another sample of energy. The intensity measured during rotation from 360° to 450° is a duplicate of that measured from 0° to 90° and serves only to position the beam for succeeding traverse scan. After rotation through the 450°, the beam is again traversed diagonally across the detector, terminating at an angle 35° off center on the first or original side of the detector. This traversal has again swept the center of the beam across the detector; however, the scan across the beam is along a line normal to the first traversal.

Hence, the beam has been traversed across the detector after 360° and after 450° of rotation respecting the initial position prior to rotation. Intensity is therefore measured along mutually perpendicular axes across the face of the beam and at two distinct radii from the intersection of these axes in the beam.

Obviously many modifications and variations of the present invention are possible in light of the above teachings. It is to be understood, therefore, that within the scope of the appended claims the invention may be practiced otherwise than as specifically described hereinabove.

I claim:

1. Automatic beam scanning apparatus for evaluating optical beacons comprising: a housing having an open-ended cylindrical chamber therethrough and disposed for rotation about the longitudinal axis thereof, an optical beacon mounted within said chamber with the optical axis substantially along the chamber longitudinal axis, an optical detector adjustably positioned in a plane which includes said chamber longitudinal axis and responsive to optical energy eminating from said chamber to provide an electrical output signal, means for rotating said chamber housing and beacon around said longitudinal axis for scanning the beam of said beacon across said detector at a radius from said optical axis, a motor driven traverse table for traversing said chamber housing and longitudinal axis within the plane of said detector and said longitudinal axis and thereby scanning through the center of the optical beam from said beacon across said detector, and recording means responsive to said detector output for recording the intensity of radiant energy sampled thereby.

2. Automatic beam scanning apparatus as set forth in claim 1 wherein said rotating means is a rotate motor, and further comprising control means coupled to said rotate motor and said traverse table motor for controlling the direction of rotation thereof.

3. In an automatic beam scanning apparatus having optical beacon mounted for optical rotation about a beacon optical axis and supported for traversal in the plane of the axis, the method of automatically sampling and recording the spatial distribution of the optical beam of a beacon comprising the steps of:

a. placing optical detecting means at an acute angle with the beacon optical axis in a plane of said axis, b. directing optical energy along said optical axis toward said detecting means, c. rotating said beacon a predetermined angular distance around said optical axis for allowing said detector to sample radiant energy therefrom at a first radius around the beam axis, d. scanning the center of said beam across said detector through an acute angle for sampling a first cross-section of radiant energy of said beam along a first scan line, e. re-rotating said beacon a second angular distance around said optical axis for sampling radiant energy at a second radius around the beam axis, and f. re-scanning the center of said beam across said detector for sampling radiant energy along another scan line.

4. The method of automatically sampling and recording the spatial distribution of the optical beam of a beacon as set forth in claim 3 and further comprising the steps of:

a. recording a graph of said sampled energy during rotation and scanning of said beam of energy across said detector for determining spatial energy distribution in said beam, and b. repeatedly scanning the center of said beam across said detector at separate and distinct positions of rotation for accurately determining spatial distribution of energy across a cross-section of the beacon beam.

* * * * *